(12) United States Patent
Takehara et al.

(10) Patent No.: US 11,277,477 B2
(45) Date of Patent: Mar. 15, 2022

(54) ON-VEHICLE COMMUNICATION DEVICE CONTROLLED BASED ON SELF-DRIVING LEVEL, COMMUNICATION CONTROL METHOD CONTROLLED BASED ON SELF-DRIVING LEVEL, AND NON-TRANSITORY STORAGE MEDIUM

(71) Applicant: JVCKENWOOD Corporation, Yokohama (JP)

(72) Inventors: Hideki Takehara, Yokohama (JP); Akinori Suyama, Yokohama (JP); Tatsumi Naganuma, Yokohama (JP); Satoru Hirose, Yokohama (JP); Takeshi Aoki, Yokohama (JP); Yasushi Watanabe, Yokohama (JP)

(73) Assignee: JVCKENWOOD Corporation, Yokohama (JP)

( * ) Notice: Subject to any disclaimer, the term of this patent is extended or adjusted under 35 U.S.C. 154(b) by 0 days.

(21) Appl. No.: 16/566,933

(22) Filed: Sep. 11, 2019

(65) Prior Publication Data
US 2020/0106836 A1 Apr. 2, 2020

(30) Foreign Application Priority Data
Sep. 27, 2018 (JP) .............................. JP2018-181401

(51) Int. Cl.
*H04L 29/08* (2006.01)
*H04L 67/125* (2022.01)
(Continued)

(52) U.S. Cl.
CPC ............ *H04L 67/125* (2013.01); *B60R 25/24* (2013.01); *B60R 25/33* (2013.01); *B60W 30/143* (2013.01);
(Continued)

(58) Field of Classification Search
CPC ....... H04W 4/40; H04W 4/48; H04W 84/005; H04W 4/44; H04W 4/46; H04W 40/20;
(Continued)

(56) References Cited

U.S. PATENT DOCUMENTS 9,566,986 B1 * 2/2017 Gordon ................ G05D 1/0061
2018/0106633 A1 * 4/2018 Chintakindi ........ G01C 21/3484
(Continued)

FOREIGN PATENT DOCUMENTS

| JP | 2003-139544 | 5/2003 |
| JP | 2015-217798 | 12/2015 |
| JP | 2019-43175 | 3/2019 |

*Primary Examiner* — Hitesh Patel
(74) *Attorney, Agent, or Firm* — Amin, Turocy & Watson, LLP

(57) ABSTRACT

Provided is an on-vehicle communication device that includes a vehicle information acquiring unit that acquires vehicle speed information on a vehicle capable of performing self-driving and/or current location information on the vehicle. The on-vehicle communication device also includes a self-driving level acquiring unit that acquires self-driving level information indicating a self-driving level of the vehicle. Further, the on-vehicle communication device includes a controller that determines whether to enable or disable a connection to a high-confidential communication channel based on the self-driving level information and the vehicle speed information and/or the current location information.

3 Claims, 11 Drawing Sheets

| SELF-DRIVING LEVEL | DEFINITION |
|---|---|
| LEVEL 0 | NO SELF-DRIVING (MONITORED BY DRIVER) |
| LEVEL 1 | ASSISTED DRIVING (MONITORED BY DRIVER) |
| LEVEL 2 | PARTIAL SELF-DRIVING (MONITORED BY DRIVER) |
| LEVEL 3 | SELF-DRIVING WITH CONDITIONS (MONITORED BY SYSTEM) |
| LEVEL 4 | COMPLETE SELF-DRIVING WITH SPECIFIC CONDITIONS (MONITORED BY SYSTEM) |
| LEVEL 5 | COMPLETE SELF-DRIVING (MONITORED BY SYSTEM) |

(51) Int. Cl.
   *B60R 25/24*      (2013.01)
   *B60W 30/14*      (2006.01)
   *G07C 5/08*       (2006.01)
   *B60R 25/33*      (2013.01)
   *B60W 40/105*     (2012.01)
   *B60W 60/00*      (2020.01)

(52) U.S. Cl.
   CPC ........ *B60W 40/105* (2013.01); *B60W 60/001* (2020.02); *G07C 5/0866* (2013.01)

(58) Field of Classification Search
   CPC ..... H04W 48/06; H04W 48/18; B60W 40/09; B60W 2050/0089; B60W 50/08; B60W 2540/30; B60W 30/143; B60W 50/10; B60W 2050/0078; B60W 2510/0638; B60W 2556/45; B60W 2556/55; B60W 2556/65; B60L 15/20; B60L 2250/20; B60L 3/12; B60L 2240/70; B60Y 2300/045
   See application file for complete search history.

(56) References Cited

U.S. PATENT DOCUMENTS

| | | | |
|---|---|---|---|
| 2018/0281614 A1* | 10/2018 | Hu | B60L 53/665 |
| 2020/0008122 A1* | 1/2020 | Radko | H04W 4/40 |
| 2020/0017042 A1* | 1/2020 | Boesch | B60L 58/10 |
| 2020/0128372 A1* | 4/2020 | Zhang | H04W 4/44 |

* cited by examiner

FIG.2

| SELF-DRIVING LEVEL | DEFINITION |
|---|---|
| LEVEL 0 | NO SELF-DRIVING (MONITORED BY DRIVER) |
| LEVEL 1 | ASSISTED DRIVING (MONITORED BY DRIVER) |
| LEVEL 2 | PARTIAL SELF-DRIVING (MONITORED BY DRIVER) |
| LEVEL 3 | SELF-DRIVING WITH CONDITIONS (MONITORED BY SYSTEM) |
| LEVEL 4 | COMPLETE SELF-DRIVING WITH SPECIFIC CONDITIONS (MONITORED BY SYSTEM) |
| LEVEL 5 | COMPLETE SELF-DRIVING (MONITORED BY SYSTEM) |

FIG.3

| SPEED LIMIT (SL) | THRESHOLD SPEED |
|---|---|
| SL < 60 km/h | 40 km/h |
| 60 km/h ≤ SL < 80 km/h | 40 km/h |
| 80 km/h ≤ SL < 100 km/h | 60 km/h |
| 100 km/h ≤ SL < 120 km/h | 80 km/h |
| 120 km/h ≤ SL | 100 km/h |

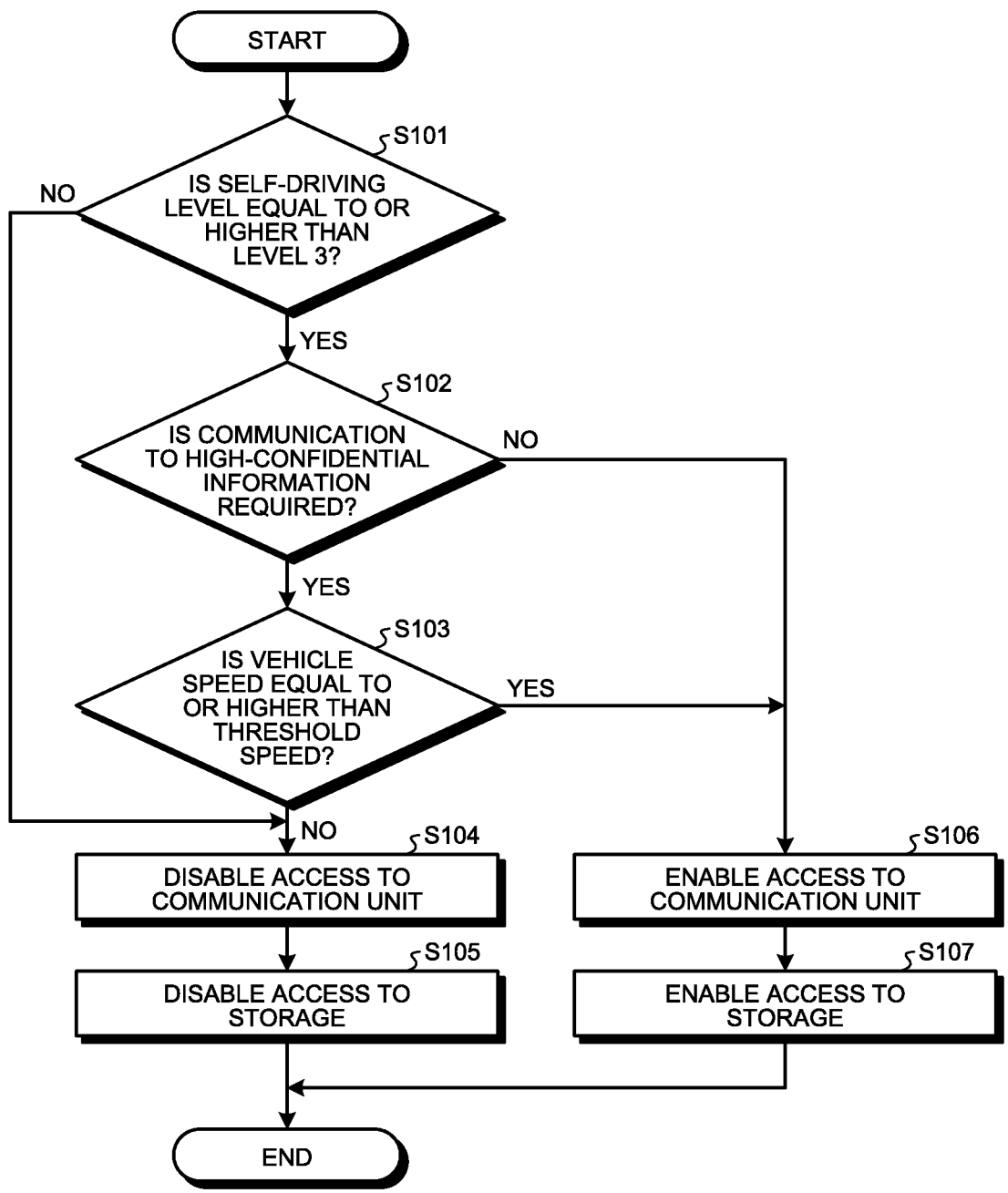

FIG.5

| THRESHOLD SPEED (TS) | CONFIDENTIALITY LEVEL |
|---|---|
| 30 km/h ≤ TS < 50 km/h | CONFIDENTIAL |
| 50 km/h ≤ TS < 80 km/h | CONFIDENTIAL · SECRET |
| 80 km/h ≤ TS | CONFIDENTIAL · SECRET · TOP SECRET |

ON-VEHICLE COMMUNICATION DEVICE CONTROLLED BASED ON SELF-DRIVING LEVEL, COMMUNICATION CONTROL METHOD CONTROLLED BASED ON SELF-DRIVING LEVEL, AND NON-TRANSITORY STORAGE MEDIUM

CROSS-REFERENCE TO RELATED APPLICATION

This application claims priority from Japanese Application No. 2018-181401, filed on Sep. 27, 2018, the contents of which are incorporated by reference herein in its entirety.

FIELD

The present application relates to an on-vehicle communication device, a communication control method, and a non-transitory storage medium.

BACKGROUND

A technology for connecting an on-vehicle device to Internet has been known (for example, see Japanese Laid-open Patent Publication No. 2003-139544). In the technology described in Japanese Laid-open Patent Publication No. 2003-139544, a connection to Internet is established when a state in which a travel speed of a vehicle is lower than a predetermined value is continued for a predetermined time, and an Internet disconnection process is performed when a state in which the travel speed is equal to or higher than a certain value is continued for a predetermined time.

If a vehicle is configured to perform self-driving, it becomes possible for a driver to perform various kinds of operation with communicating with devices located outside the vehicle by using an electronic device. A degree of driver's involvement in driving of the vehicle varies depending on a self-driving level of the vehicle. Therefore, it is desired to appropriately control communication with the devices located outside the vehicle depending on the self-driving level of the vehicle.

SUMMARY

An on-vehicle communication device, a communication control method, and a non-transitory storage medium are disclosed.

According to one aspect, there is provided an on-vehicle communication device comprising: a vehicle information acquiring unit configured to acquire at least one of vehicle speed information on a vehicle capable of performing self-driving and current location information on the vehicle; a self-driving level acquiring unit configured to acquire self-driving level information indicating a self-driving level of the vehicle; and a controller configured to determine whether to enable or disable a connection to a high-confidential communication channel based on the self-driving level information and at least one of the vehicle speed information and the current location information.

According to one aspect, there is provided an on-vehicle communication device comprising: a vehicle information acquiring unit configured to acquire at least one of vehicle speed information on a vehicle capable of performing self-driving and current location information on the vehicle; a self-driving level acquiring unit configured to acquire self-driving level information indicating a self-driving level of the vehicle; and a controller configured to determine an accessible confidentiality level based on the self-driving level information and at least one of the vehicle speed information and the current location information.

According to one aspect, there is provided an on-vehicle communication device comprising: a vehicle information acquiring unit configured to acquire at least one of vehicle speed information on a vehicle capable of performing self-driving and current location information on the vehicle; a self-driving level acquiring unit configured to acquire self-driving level information indicating a self-driving level of the vehicle; and a controller configured to determine a video to be displayed based on the self-driving level information and at least one of the vehicle speed information and the current location information.

According to one aspect, there is provided a communication control method comprising: acquiring at least one of vehicle speed information on a vehicle capable of performing self-driving and current location information on the vehicle; acquiring self-driving level information indicating a self-driving level of the vehicle; and determining whether to enable or disable a connection to a high-confidential communication channel based on the self-driving level information and at least one of the vehicle speed information and the current location information.

According to one aspect, there is provided a communication control method comprising: acquiring at least one of vehicle speed information on a vehicle capable of performing self-driving and current location information on the vehicle; acquiring self-driving level information indicating a self-driving level of the vehicle; and determining an accessible confidentiality level based on the self-driving level information and at least one of the vehicle speed information and the current location information.

According to one aspect, there is provided a communication control method comprising: acquiring at least one of vehicle speed information on a vehicle capable of performing self-driving and current location information on the vehicle; acquiring self-driving level information indicating a self-driving level of the vehicle; and determining a video to be displayed based on the self-driving level information and at least one of the vehicle speed information and the current location information.

According to one aspect, there is provided a non-transitory storage medium that stores a computer program for causing a computer to execute: acquiring at least one of vehicle speed information on a vehicle capable of performing self-driving and current location information on the vehicle; acquiring self-driving level information indicating a self-driving level of the vehicle; and determining whether to enable or disable a connection to a high-confidential communication channel based on the self-driving level information and at least one of the vehicle speed information and the current location information.

According to one aspect, there is provided a non-transitory storage medium that stores a computer program for causing a computer to execute: acquiring at least one of vehicle speed information on a vehicle capable of performing self-driving and current location information on the vehicle; acquiring self-driving level information indicating a self-driving level of the vehicle; and determining an accessible confidentiality level based on the self-driving level information and at least one of the vehicle speed information and the current location information.

According to one aspect, there is provided a non-transitory storage medium that stores a computer program for causing a computer to execute: acquiring at least one of vehicle speed information on a vehicle capable of performing self-driving and current location information on the vehicle; acquiring self-driving level information indicating a self-driving level of the vehicle; and determining a video to be displayed based on the self-driving level information and at least one of the vehicle speed information and the current location information.

The above and other objects, features, advantages and technical and industrial significance of this application will be better understood by reading the following detailed description of presently preferred embodiments of the application, when considered in connection with the accompanying drawings.

BRIEF DESCRIPTION OF THE DRAWINGS

FIG. 2 is a diagram for explaining a self-driving level;
FIG. 3 is a diagram for explaining a threshold speed;
FIG. 4 is a flowchart illustrating a flow of processes performed by the on-vehicle communication device according to the first embodiment;
FIG. 5 is a diagram for explaining a threshold speed and a confidentiality level.

DETAILED DESCRIPTION OF THE PREFERRED EMBODIMENTS

Preferred embodiments of an on-vehicle communication device, a communication control method, and a non-transitory storage medium according to the present application will be described in detail below with reference to the accompanying drawings. The present application is not limited by the embodiments below.

First Embodiment

Figure 1:
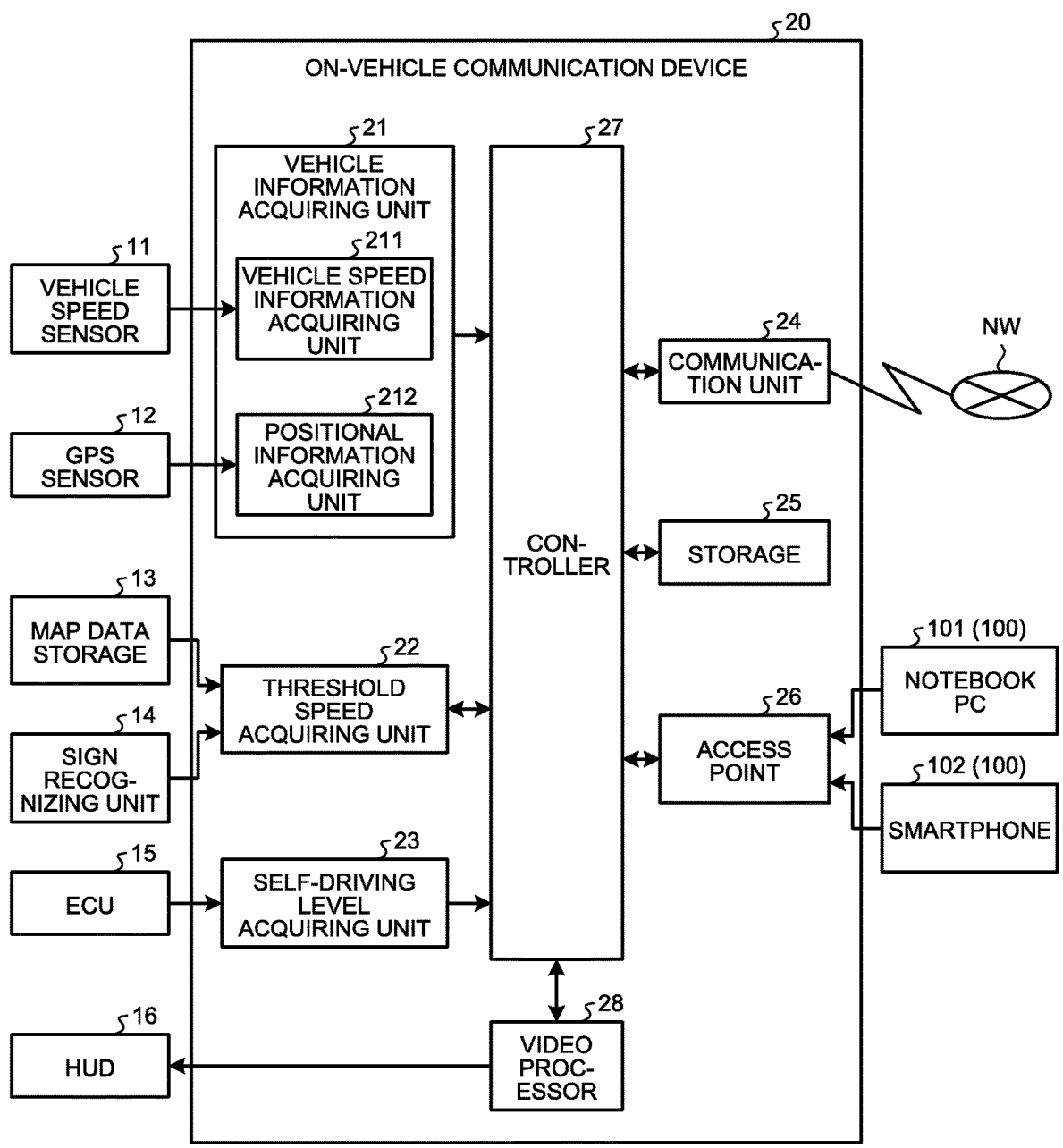
FIG. 1 is a block diagram illustrating a configuration example of an on-vehicle communication device according to a first embodiment.

FIG. 1 is a block diagram illustrating a configuration example of an on-vehicle communication device according to a first embodiment. A vehicle is able to perform self-driving. The vehicle includes a vehicle speed sensor 11, a global positioning system (GPS) sensor 12, a map data storage 13, a sign recognizing unit 14, an electronic controller (ECU) 15, a head-up display device (HUD) 16, and an on-vehicle communication device 20.

The vehicle speed sensor 11 detects a vehicle speed of the vehicle. More specifically, the vehicle speed sensor 11 is arranged on a drive shaft or a tire of the vehicle. The vehicle speed sensor 11 detects a pulse signal corresponding to a rotation of the drive shaft or the tire. The vehicle speed sensor 11 outputs the detected pulse signal to a vehicle speed information acquiring unit 211 of the on-vehicle communication device 20.

The GPS sensor 12 detects a current location of the vehicle. The GPS sensor 12 is, for example, a GPS receiver. The GPS sensor 12 outputs acquired current location information on the vehicle and acquired travel direction information to a positional information acquiring unit 212 of a vehicle information acquiring unit 21 of the on-vehicle communication device 20. For example, when the on-vehicle communication device 20 includes the GPS sensor 12 in a built-in manner or the on-vehicle communication device 20 is connected to the GPS sensor 12, the vehicle speed information acquiring unit 211 may calculate the vehicle speed from positional information and time information of the GPS sensor 12.

The map data storage 13 stores therein map information. The map information is information on a road map including, for example, speed limit information on each of roads. The map information may include route guide information on a destination. The map data storage 13 outputs the stored map information to a threshold speed acquiring unit 22 of the on-vehicle communication device 20.

The sign recognizing unit 14 recognizes road signs. More specifically, the sign recognizing unit 14 performs an image recognition process on captured video data of surroundings of the vehicle, and recognizes a sign indicating a speed limit. The sign recognizing unit 14 outputs sign information on the recognized sign to the threshold speed acquiring unit 22 of the on-vehicle communication device 20.

The ECU 15 is a controller that controls each of units that implement functions of traveling, steering, and stopping of the vehicle. When the vehicle is in a self-driving state, the ECU 15 outputs self-driving level information indicating a self-driving level to a self-driving level acquiring unit 23 of the on-vehicle communication device 20.

The self-driving level will be described below with reference to FIG. 2. FIG. 2 is a diagram for explaining the self-driving level. A self-driving level 0 indicates that self-driving is not performed and a driver performs all control related to travel of the vehicle. At the self-driving level 0, the driver monitors a travel state of the vehicle.

A self-driving level 1 indicates that a system assists driving. For example, the system puts a brake, performs driving with following a preceding vehicle, and assists driving so as not to deviate from a driving lane. At the self-driving level 1, the driver monitors the travel state of the vehicle.

A self-driving level 2 indicates that self-driving is partially performed. For example, the system performs driving with following a preceding vehicle while keeping travelling on a driving lane. At the self-driving level 2, the driver monitors the travel state of the vehicle.

A self-driving level 3 indicates that self-driving is performed with some conditions. More specifically, the self-driving level 3 indicates that the system performs all control related to driving on specific roads mainly such as expressways. At the self-driving level 3, the driver needs to cope with the control when the system requests the driver to intervene in the driving. At the self-driving level 3, the system monitors the travel state of the vehicle.

A self-driving level 4 indicates that complete self-driving is performed with specific conditions. At the self-driving level 4, the system performs all control related to driving if the specific conditions are satisfied. At the self-driving level 4, the system monitors the travel state of the vehicle.

A self-driving level 5 indicates that complete self-driving is performed in all of travel areas. At the self-driving level 5, the system continuously performs all control related to driving. At the self-driving level 5, the system monitors the travel state of the vehicle.

Referring back to FIG. 1, the HUD 16 makes a virtual image of a video visible on a front of a line of sight of the driver. The HUD 16 includes a projector (not illustrated). More specifically, the HUD 16 displays a video on the projector based on a video signal obtained from a video processor 28 of the on-vehicle communication device 20. The HUD 16 reflects, onto a windshield (front window) or a combiner, display light of a video that is displayed on the projector and makes the display light visible, as a virtual image, to the driver. In the first embodiment, the HUD 16 makes a video displayed on a mobile electronic device 100 visible as a virtual image via an access point of an in-vehicle local area network (LAN) (hereinafter, referred to as the "access point") 26 and the video processor 28.

The on-vehicle communication device 20 functions as a repeater (router) that controls communication performed by a notebook personal computer 101 or a smartphone 102, which is brought into the vehicle, via a communication network NW. In the following description, the notebook personal computer 101 and the smartphone 102 may be collectively referred to as the mobile electronic device 100 when they need not be specifically distinguished from each other. The on-vehicle communication device 20 is, for example, an arithmetic processing device including a central processor (CPU) or the like. The on-vehicle communication device 20 loads a program stored in a storage 25 onto a memory and executes commands included in the program. The on-vehicle communication device 20 includes an internal memory (not illustrated), and the internal memory is used to temporarily store therein data in the on-vehicle communication device 20. The on-vehicle communication device 20 includes the vehicle information acquiring unit 21, the threshold speed acquiring unit 22, the self-driving level acquiring unit 23, a communication unit 24, the storage 25, the access point 26, a controller 27, and the video processor 28.

The vehicle information acquiring unit 21 acquires information on the vehicle via a controller area network (CAN), a local interconnect network (LIN), or the like. The vehicle information acquiring unit 21 includes the vehicle speed information acquiring unit 211 and the positional information acquiring unit 212.

The vehicle speed information acquiring unit 211 acquires a vehicle speed of the vehicle. The vehicle speed information acquiring unit 211 calculates the vehicle speed from the pulse signal acquired by the vehicle speed sensor 11. In the first embodiment, the vehicle speed information acquiring unit 211 calculates a minimum value of the vehicle speed in the past 10 seconds. The vehicle speed information acquiring unit 211 outputs vehicle speed information indicating the calculated vehicle speed to the controller 27.

The positional information acquiring unit 212 acquires positional information on a current location of the vehicle. More specifically, the positional information acquiring unit 212 acquires the positional information on the current location of the vehicle from the GPS sensor 12.

The threshold speed acquiring unit 22 acquires a threshold speed based on a speed limit for a road on which the vehicle is traveling. More specifically, the threshold speed acquiring unit 22 acquires, from the map data storage 13, a current location in which the vehicle is traveling and a speed limit for a road in a traveling direction, based on the current location information on the vehicle and the travel direction information acquired by the positional information acquiring unit 212. In this case, it is assumed that the map data storage 13 stores therein the speed limit as information. Alternatively, the threshold speed acquiring unit 22 acquires the speed limit for the road on which the vehicle is traveling, based on sign information acquired from the sign recognizing unit 14. Further, as the speed limit, it may be possible to acquire a speed limit stored in a cloud via the communication unit 24. The threshold speed acquiring unit 22 acquires a threshold speed corresponding to the acquired speed limit. The threshold speed acquiring unit 22 outputs threshold speed information indicating the acquired threshold speed to the controller 27.

The threshold speed corresponding to the speed limit for the road may be stored in the storage 25 in advance. Alternatively, the threshold speed corresponding to the speed limit for the road may be set to a speed corresponding to a predetermined percentage, such as 80 percent, of the speed limit.

An example of the threshold speed that is stored in advance in the storage 25 in association with the speed limit will be described below with reference to FIG. 3. FIG. 3 is a diagram for explaining the threshold speed. When the speed limit is lower than 60 km/h, the threshold speed is 40 km/h. When the speed limit is equal to or higher than 60 km/h and lower than 80 km/h, the threshold speed is 40 km/h. When the speed limit is equal to or higher than 80 km/h and lower than 100 km/h, the threshold speed is 60 km/h. When the speed limit is equal to or higher than 100 km/h and lower than 120 km/h, the threshold speed is 80 km/h. When the speed limit is equal to or higher than 120 km/h, the threshold speed is 100 km/h.

The self-driving level acquiring unit 23 acquires the self-driving level via the CAN or the LIN. The self-driving level acquiring unit 23 acquires the self-driving level information from the ECU 15 via the CAN. Alternatively, the self-driving level acquiring unit 23 acquires the self-driving level information via the LIN through operations performed on buttons by the driver. The self-driving level acquiring unit 23 outputs the acquired self-driving level information to the controller 27.

The communication unit 24 is a communication unit. The communication unit 24 enables communication between the on-vehicle communication device 20 and external devices via the communication network NW.

The storage 25 stores therein data needed for various kinds of processing performed by the on-vehicle communication device 20 and various processing results. The storage 25 stores therein high-confidential information. The storage 25 is a storage, such as a semiconductor memory device including a random access memory (RAM), a read only memory (ROM), and a flash memory, a hard disk, an optical disk, or an external storage used via the communication network NW.

The access point 26 is a repeater of the in-vehicle LAN. The access point 26 enables the mobile electronic device 100 to connect to the communication network NW via the communication unit 24. More specifically, the access point 26 provides an access point for wireless communication, such as Wi-fi (registered trademark), to the mobile electronic device 100.

The controller 27 determines whether to enable or disable a connection to a high-confidential communication channel, based on the self-driving level information acquired by the self-driving level acquiring unit 23, the vehicle speed information acquired by the vehicle speed information acquiring unit 211, and the threshold speed information acquired by the threshold speed acquiring unit 22.

The high-confidential communication channel is, for example, a communication channel to an intranet. A connection to the high-confidential communication channel is stored, in advance, in the storage 25 as an access control list (hereinafter, referred to as an "ACL") for controlling access to the communication channel. In the ACL, information on the communication channel including, for example, an IP address, a port number, or a protocol, for accessing the high-confidential information is set. The communication channel described in the ACL is a communication channel used to access the high-confidential information. High-confidential communication described in the ACL is encrypted or used with strict authentication, and therefore, information is less likely to be leaked on the communication channel. Communication channels that are not described in the ACL are communication channels used to access low-confidential information.

The controller 27 enables a connection to the high-confidential communication channel when the self-driving level is equal to or higher than a predetermined level and the vehicle speed is equal to or higher than the threshold speed, based on the self-driving level information, the vehicle speed information, and the threshold speed information. The controller 27 disables a connection to the high-confidential communication channel when the self-driving level is lower than the predetermined level or the vehicle speed is lower than the threshold speed, based on the self-driving level information, the vehicle speed information, and the threshold speed information.

In the first embodiment, it is assumed that the predetermined level is the self-driving level 3. At the self-driving level 3 or higher, the system monitors the travel state of the vehicle. At the self-driving level 3 or higher, it is possible to leave the driving of the vehicle to the vehicle. Therefore, at the self-driving level 3 or higher, the driver is able to perform various kinds of operation by using the mobile electronic device 100 in the vehicle.

The threshold speed is a speed at which, for example, information that is displayed as a virtual image by the HUD 16 is not looked at or captured by other vehicles or pedestrians around the vehicle. In the first embodiment, the threshold speed is set to be equal to or higher than 40 km/h depending on the vehicle speed.

The video processor 28 causes the HUD 16 to make a video visible as a virtual image. The video processor 28 causes the HUD 16 to make a video displayed on the mobile electronic device 100 visible as a virtual image. More specifically, the video processor 28 causes the projector of the HUD 16 to display the video such that display light of the displayed video is reflected and made visible, as a virtual image, to the driver.

Next, a flow of processes performed by the controller 27 of the on-vehicle communication device 20 will be described with reference to FIG. 4. FIG. 4 is a flowchart illustrating the flow of processes performed by the on-vehicle communication device according to the first embodiment. The on-vehicle communication device 20 operates while the vehicle on which the on-vehicle communication device 20 is mounted is operating. The state in which the vehicle on which the on-vehicle communication device 20 is mounted is operating means that a driving source of the vehicle is operating, such as that an engine is in an ON state or a power supply is in an ON state. The on-vehicle communication device 20 may start and terminate operation in accordance with operation performed by the driver.

The mobile electronic device 100 that is brought into the vehicle by an occupant is able to perform communication with the communication network NW via the on-vehicle communication device 20. The mobile electronic device 100 is communicably connected to the on-vehicle communication device 20 via the access point 26.

When the mobile electronic device 100 is to be connected to the communication network NW, communication from the mobile electronic device 100 to the on-vehicle communication device 20 occurs. More specifically, the mobile electronic device 100 transmits a packet to the access point 26. The packet includes information on data to be communicated and additional information including information on a communication source and information on a communication destination. The additional information includes, for example, information on communication channels including IP addresses, port numbers, or protocols on the communication source and the communication destination. The processes described below are performed per packet.

The controller 27 determines whether the self-driving level is equal to or higher than the level 3 based on the self-driving level information acquired by the self-driving level acquiring unit 23 (Step S101). When the controller 27 determines that the self-driving level is equal to or higher than the level 3 (Yes at Step S101), the process proceeds to Step S102. When the controller 27 determines that the self-driving level is not equal to or higher than the level 3 (No at Step S101), the process proceeds to Step S104.

When it is determined that the self-driving level is equal to or higher than the level 3 (Yes at Step S101), the controller 27 determines whether communication to the high-confidential information is required (Step S102). More specifically, when the information on the communication destination in the additional information included in the packet received by the access point 26 matches information on the communication channel described in the ACL, the controller 27 determines that the communication to the high-confidential information is required. When the information on the communication destination in the additional information included in the packet does not match the information on the communication channel described in the ACL, the controller 27 determines that the communication is not communication to the high-confidential information. When the controller 27 determines that the communication to the high-confidential information is required (Yes at Step S102), the process proceeds to Step S103. When the controller 27 determines that the communication is not communication to the high-confidential information (No at Step S102), the process proceeds to Step S106.

When it is determined that the communication to the high-confidential information is required (Yes at Step S102), the controller 27 determines whether the vehicle speed is equal to or higher than the threshold speed (Step S103). More specifically, the controller 27 causes the vehicle speed information acquiring unit 211 to acquire the vehicle speed information on the vehicle. The controller 27 causes the threshold speed acquiring unit 22 to acquire a speed limit for a road on which the vehicle is traveling. The controller 27 causes the threshold speed acquiring unit 22 to acquire the threshold speed corresponding to the acquired speed limit. When the controller 27 determines that the vehicle speed is equal to or higher than the threshold speed (Yes at Step S103), the process proceeds to Step S106. When the controller 27 determines that the vehicle speed is not equal to or higher than the threshold speed (No at Step S103), the process proceeds to Step S104.

When it is determined that the self-driving level is not equal to or higher than the level 3 (No at Step S101), or when the self-driving level is equal to or higher than the level 3 and the communication to the high-confidential information is required and when the vehicle speed is not equal to or higher than the threshold speed (No at Step S103), the controller 27 disables access from the mobile electronic device 100 to the communication unit 24 (Step S104). The controller 27 proceeds to Step S105.

The controller 27 disables access from the mobile electronic device 100 to the storage 25 (Step S105). The controller 27 terminates the processes.

When the self-driving level is equal to or higher than the level 3 and when the communication to the high-confidential information is not required (No at Step S102), or when the self-driving level is equal to or higher than the level 3 and when the communication to the high-confidential information is required and when the vehicle speed is equal to or higher than the threshold speed (Yes at Step S103), the controller 27 enables access from the mobile electronic device 100 to the communication unit 24 (Step S106). The controller 27 proceeds to Step S107.

The controller 27 enables access from the mobile electronic device 100 to the storage 25 (Step S107). The controller 27 terminates the processes.

As described above, at a time of the communication to the high-confidential information from the mobile electronic device 100, when the self-driving level is equal to or higher than the level 3 and when the vehicle speed is equal to or higher than the threshold speed, the access from the mobile electronic device 100 to the communication unit 24 and the storage 25 of the on-vehicle communication device 20 is enabled. The mobile electronic device 100 acquires the high-confidential information from an external device connected to the communication network NW via the storage 25 or the communication unit 24. The high-confidential information acquired by the mobile electronic device 100 is displayed, as a virtual image, by the HUD 16 via the video processor 28.

When the communication to the high-confidential information is not required, the information acquired by the mobile electronic device 100 is displayed, as a virtual image, by the HUD 16 via the video processor 28.

As described above, in the first embodiment, when the mobile electronic device 100 performs the communication to the high-confidential information, it is possible to enable or disable the access from the mobile electronic device 100 to the communication unit 24 and the storage 25 of the on-vehicle communication device 20 in accordance with the self-driving level and the vehicle speed. According to the first embodiment, at a time of the communication to the high-confidential information from the mobile electronic device 100, when the self-driving level is equal to or higher than the level 3 and when the vehicle speed is equal to or higher than the threshold speed, it is possible to enable the access from the mobile electronic device 100 to the communication unit 24 and the storage 25 of the on-vehicle communication device 20. In this manner, according to the first embodiment, it is possible to appropriately control the communication with the outside of the vehicle in accordance with the self-driving level of the vehicle.

The high-confidential communication is encrypted or used with strict authentication, and therefore, information is less likely to be leaked on the communication channel. Therefore, it is desired to prevent information leakage when the high-confidential information is displayed outside the communication channel, for example. In the first embodiment, access to the high-confidential information is permitted only when the self-driving level is a level at which it is possible to leave the driving over to the vehicle and when the inside of the vehicle is not looked at or captured by pedestrians or surrounding vehicles due to the travelling at a speed equal to or higher than the threshold vehicle speed. According to the first embodiment, it is possible to view the high-confidential information inside the vehicle with safety and security.

Furthermore, according to the first embodiment, the high-confidential information is accessed and viewed as a virtual image when the speed is equal to or higher than the threshold speed. Therefore, in the first embodiment, it is possible to reduce a risk that the high-confidential information displayed as the virtual image by the HUD 16 is looked at or captured by pedestrians or occupants in other vehicles.

Second Embodiment

Figure 6:
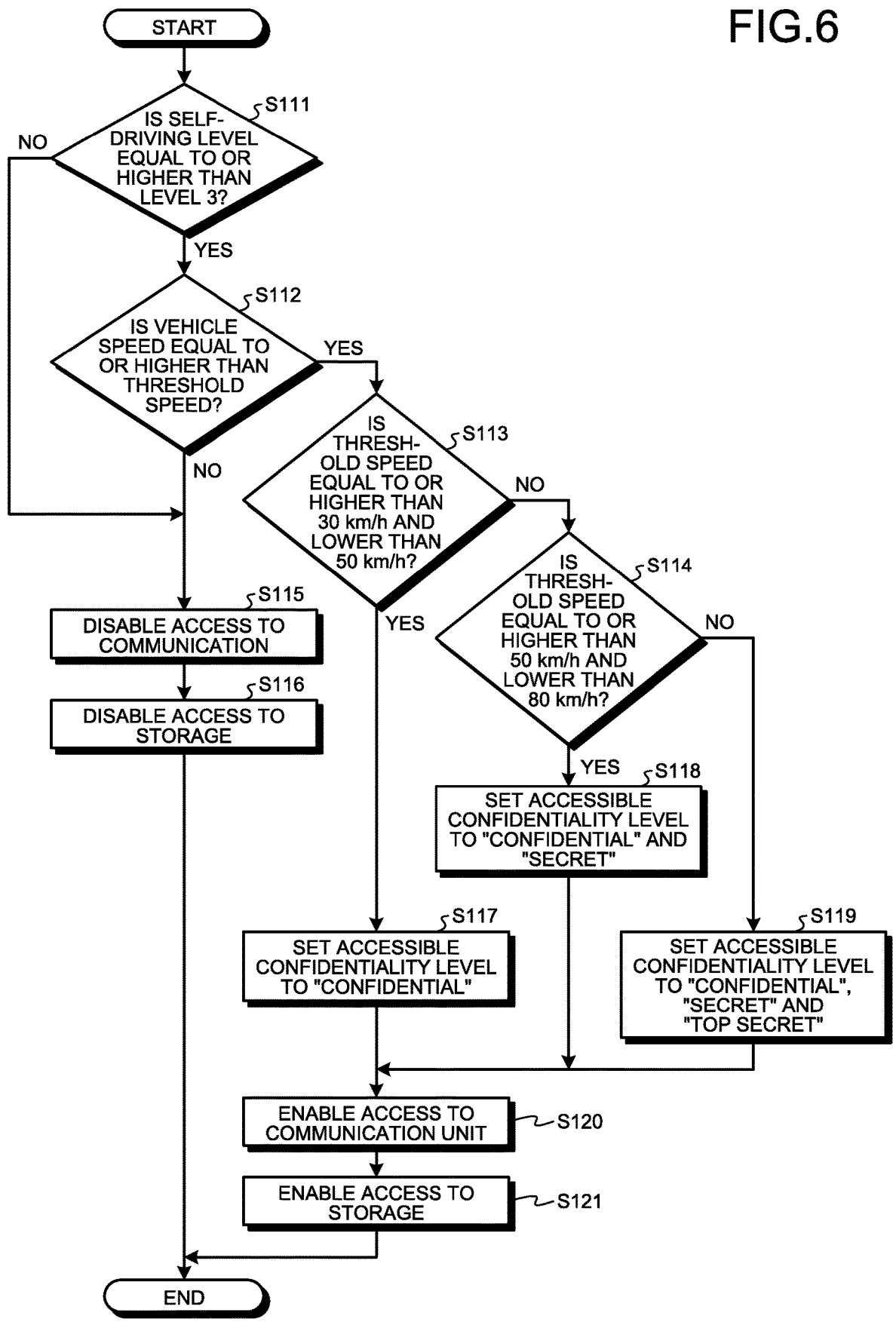
FIG. 6 is a flowchart illustrating a flow of processes performed by an on-vehicle communication device according to a second embodiment.

An on-vehicle communication device 20 according to a second embodiment will be described with reference to FIG. 5 and FIG. 6. FIG. 5 is a diagram for explaining a threshold speed and a confidentiality level. FIG. 6 is a flowchart illustrating a flow of processes performed by the on-vehicle communication device according to the second embodiment. A basic configuration of the on-vehicle communication device 20 is the same as the on-vehicle communication device 20 of the first embodiment. In the following description, the same components as those of the on-vehicle communication device 20 are denoted by the same or corresponding reference symbols, and detailed explanation thereof will be omitted. The second embodiment is different from the first embodiment in that the controller 27 performs a different process.

The controller 27 determines an accessible confidentiality level based on the self-driving level information acquired by the self-driving level acquiring unit 23 and the vehicle speed information acquired by the vehicle speed information acquiring unit 211. In the second embodiment, the controller 27 determines the accessible confidentiality level based on the self-driving level information acquired by the self-driving level acquiring unit 23, the vehicle speed information acquired by the vehicle speed information acquiring unit 211, and the threshold speed information on the threshold speed that is set in accordance with the vehicle speed acquired by the threshold speed acquiring unit 22. More specifically, the controller 27 determines the accessible confidentiality level in accordance with the threshold speed when the self-driving level is equal to or higher than the predetermined level and the vehicle speed is equal to or higher than the threshold speed, based on the self-driving level information, the vehicle speed information, and the threshold speed information.

The confidentiality level is a level of confidentiality. In the second embodiment, the levels are set to "confidential", "secret", and "top secret" in ascending order. "Confidential" indicates that disclosure to only employee of a company is permitted but disclosure to third parties outside the company is prohibited. "Secret" indicates that disclosure to only members in a responsible department is permitted but disclosure to third parties outside the department is prohibited. "Top secret" indicates that disclosure to only qualified persons is permitted but disclosure to third parties is prohibited. Access to information with higher confidentiality is permitted as the threshold speed increases.

An example of a relationship between the threshold speed and the accessible confidentiality level will be described with reference to FIG. 5. For example, it is assumed that access to "confidential" is permitted when the threshold speed is equal to or higher than 30 km/h and lower than 50 km/h. For example, it is assumed that access to "confidential" and "secret" is permitted when the threshold speed is equal to or higher than 50 km/h and lower than 80 km/h. For example, it is assumed that access to "confidential", "secret", and "top secret" is permitted when the threshold speed is equal to or higher than 80 km/h.

Next, the flow of processes performed by the controller 27 will be described with reference to FIG. 6. Processes at Step S111, Step S112, Step S115, Step S116, Step S120, and Step S121 are the same as the processes at Step S101, Step S103, Step S104, Step S105, Step S106, and Step S107 in the flowchart illustrated in FIG. 4.

When it is determined that the vehicle speed is equal to or higher than the threshold speed (Yes at Step S112), the controller 27 determines whether the threshold speed is equal to or higher than 30 km/h and lower than 50 km/h (Step S113). When the controller 27 determines that the threshold speed is equal to or higher than 30 km/h and lower than 50 km/h (Yes at Step S113), the process proceeds to Step S117. When the controller 27 does not determine that the threshold speed is equal to or higher than 30 km/h and lower than 50 km/h (No at Step S113), the process proceeds to Step S114.

The controller 27 determines whether the threshold speed is equal to or higher than 50 km/h and lower than 80 km/h (Step S114). When the controller 27 determines that the threshold speed is equal to or higher than 50 km/h and lower than 80 km/h (Yes at Step S114), the process proceeds to Step S118. When the controller 27 does not determine that the threshold speed is equal to or higher than 50 km/h and lower than 80 km/h (No at Step S114), the process proceeds to Step S119.

When the threshold speed is equal to or higher than 30 km/h and lower than 50 km/h (Yes at Step S113), the controller 27 sets the accessible confidentiality level to "confidential" (Step S117). The controller 27 proceeds to Step S120.

When the threshold speed is equal to or higher than 50 km/h and lower than 80 km/h (Yes at Step S114), the controller 27 sets the accessible confidentiality level to "confidential" and "secret" (Step S118). The controller 27 proceeds to Step S120.

When the threshold speed is equal to or higher than 80 km/h (No at Step S114), the controller 27 sets the accessible confidentiality level to "confidential", "secret", and "top secret" (Step S119). The controller 27 proceeds to Step S120.

As described above, in the second embodiment, when the mobile electronic device 100 performs communication to the high-confidential information, it is possible to set the accessible confidentiality level in accordance with the self-driving level and the vehicle speed. According to the second embodiment, when the self-driving level is equal to or higher than the level 3, it is possible to permit access to information with higher confidentiality as the threshold speed that is set in accordance with the vehicle speed increases.

Third Embodiment

Figure 7:
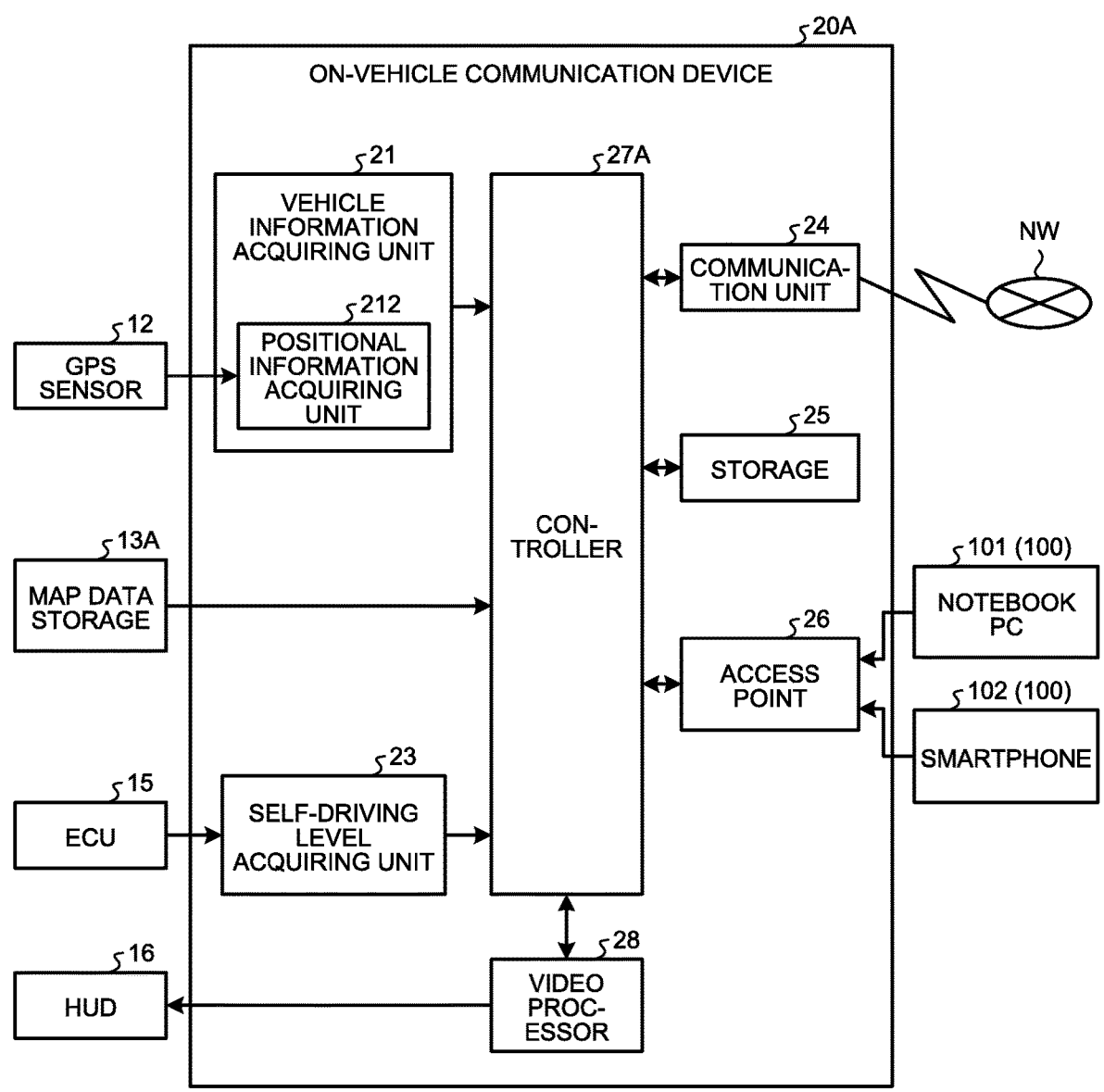
FIG. 7 is a block diagram illustrating a configuration example of an on-vehicle communication device according to a third embodiment.
Figure 8:
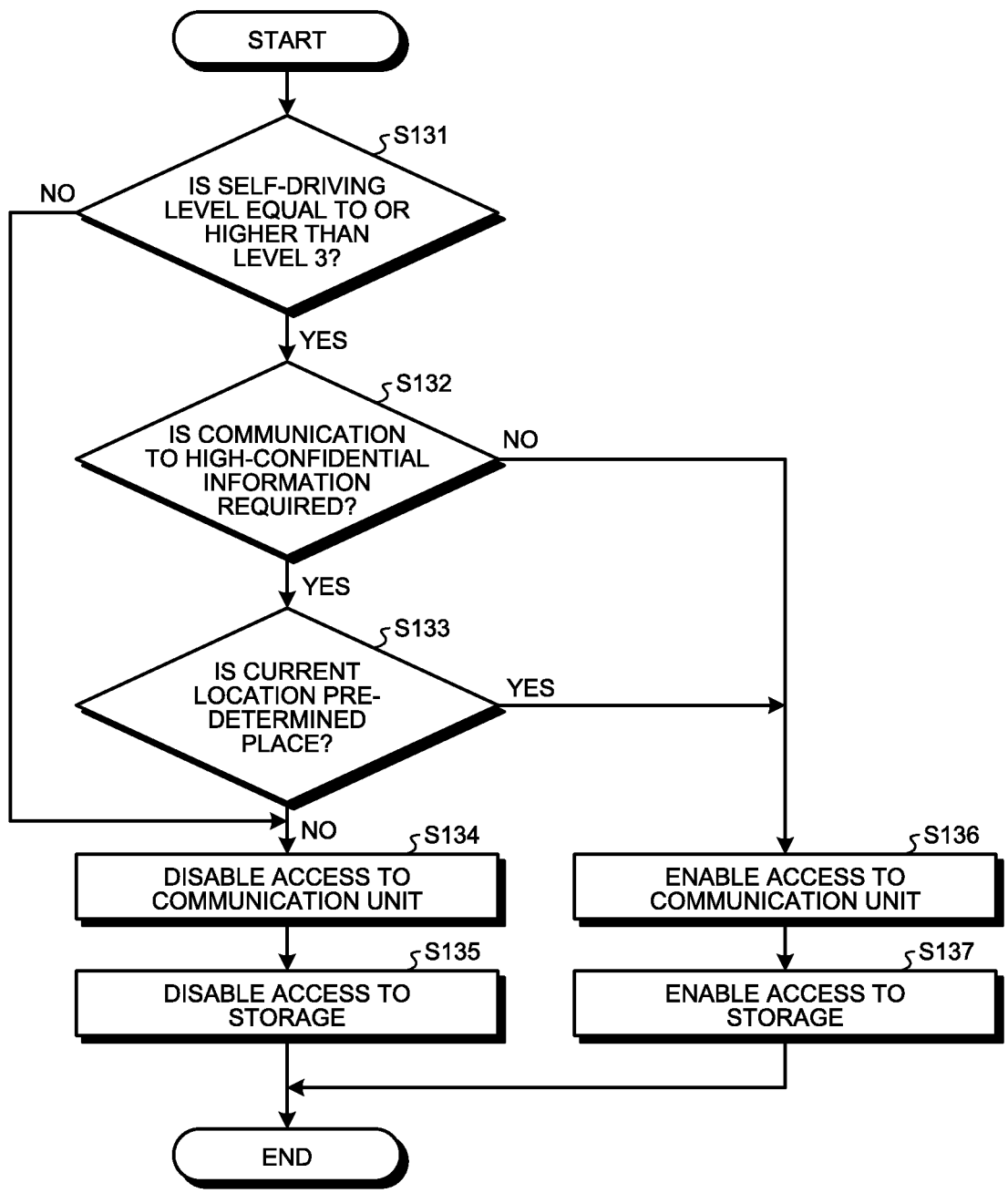
FIG. 8 is a flowchart illustrating a flow of processes performed by the on-vehicle communication device according to the third embodiment.

An on-vehicle communication device 20A according to a third embodiment will be described with reference to FIG. 7 and FIG. 8. FIG. 7 is a block diagram illustrating a configuration example of the on-vehicle communication device according to the third embodiment. FIG. 8 is a flowchart illustrating a flow of processes performed by the on-vehicle communication device according to the third embodiment. The third embodiment is different from the first embodiment in that the on-vehicle communication device 20A has a different configuration.

A vehicle includes the GPS sensor 12, a map data storage 13A, the ECU 15, the HUD 16, and the on-vehicle communication device 20A.

Map information stored in the map data storage 13A includes, for example, road information indicating whether a road is an expressway or a highway. Further, the map information includes information capable of recognizing downtown, such as landmark information indicating a landmark including a convenience store, a restaurant, and a public facility.

The on-vehicle communication device 20A includes the vehicle information acquiring unit 21 including the positional information acquiring unit 212, the self-driving level acquiring unit 23, the communication unit 24, the storage 25, the access point 26, a controller 27A, and the video processor 28.

The controller 27A determines whether to enable or disable a connection to the high-confidential communication channel, based on the self-driving level information acquired by the self-driving level acquiring unit 23 and the current location information on the vehicle acquired by the positional information acquiring unit 212. More specifically, the controller 27 enables a connection to the high-confidential communication channel when the self-driving level is equal to or higher than a predetermined level and the current location is a predetermined place, based on the self-driving level information and the current location information. The controller 27 disables a connection to the high-confidential communication channel when the self-driving level is lower than the predetermined level or the current location is not the predetermined place, based on the self-driving level information and the current location information.

The predetermined place is, for example, the expressway or the highway. The controller 27A is able to determine whether the current location of the vehicle is one of the expressway and the highway, based on the positional information acquired by the positional information acquiring unit 212 and the road information acquired by the map data storage 13A.

Alternatively, the predetermined place is, for example, a place except for busy downtown. The controller 27A is able to determine that the current location of the vehicle is not busy downtown when a density of the landmark information is lower than a predetermined value based on the positional information and the landmark information.

Alternatively, the predetermined place is a safe area which is stored in advance and in which information leakage can hardly occur. For example, an area within a company's ground is the safe area. The predetermined place may be an area except for an area which is stored in advance and in which information leakage is highly likely to occur. For example, downtown near the company may be set as the area in which information leakage is highly likely to occur. In this case, it is preferable to store the predetermined place in an external server device that is connectable via the communication unit 24 and acquire the predetermined place from the server device when the controller 27A performs processes.

Next, the flow of processes performed by the controller 27A will be described with reference to FIG. 8. Processes at Step S131, Step S132, and Step S134 to Step S137 are the same as the processes at Step S101, Step S102, and Step S104 to Step S107 in the flowchart illustrated in FIG. 4.

When it is determined that the communication to the high-confidential information is required (Yes at Step S132), the controller 27 determines whether the current location of the vehicle is the predetermined place (Step S133). More specifically, the controller 27 causes the positional information acquiring unit 212 to acquire positional information on the vehicle. When the controller 27 determines that the positional information on the vehicle indicates the predetermined place (Yes at Step S133), the process proceeds to Step S136. When the controller 27 determines that the positional information on the vehicle does not indicate the predetermined place (No at Step S133), the process proceeds to Step S134.

As described above, in the third embodiment, when the mobile electronic device 100 performs the communication to the high-confidential information, the access from the mobile electronic device 100 to the communication unit 24 and the storage 25 of the on-vehicle communication device 20 is enabled or disabled in accordance with the self-driving level and the current location of the vehicle. According to the third embodiment, at a time of the communication to the high-confidential information, when the self-driving level is equal to or higher than the level 3 and the current location on the vehicle indicates the predetermined place, it is possible to enable the access from the mobile electronic device 100 to the communication unit 24 and the storage 25 of the on-vehicle communication device 20. In this manner, in the third embodiment, when the self-driving level is equal to or higher than the level 3, it is possible to enable communication from the mobile electronic device 100 to the high-confidential information in a place in which information is less likely to be looked at or captured by surrounding vehicles or persons.

Fourth Embodiment

Figure 9:
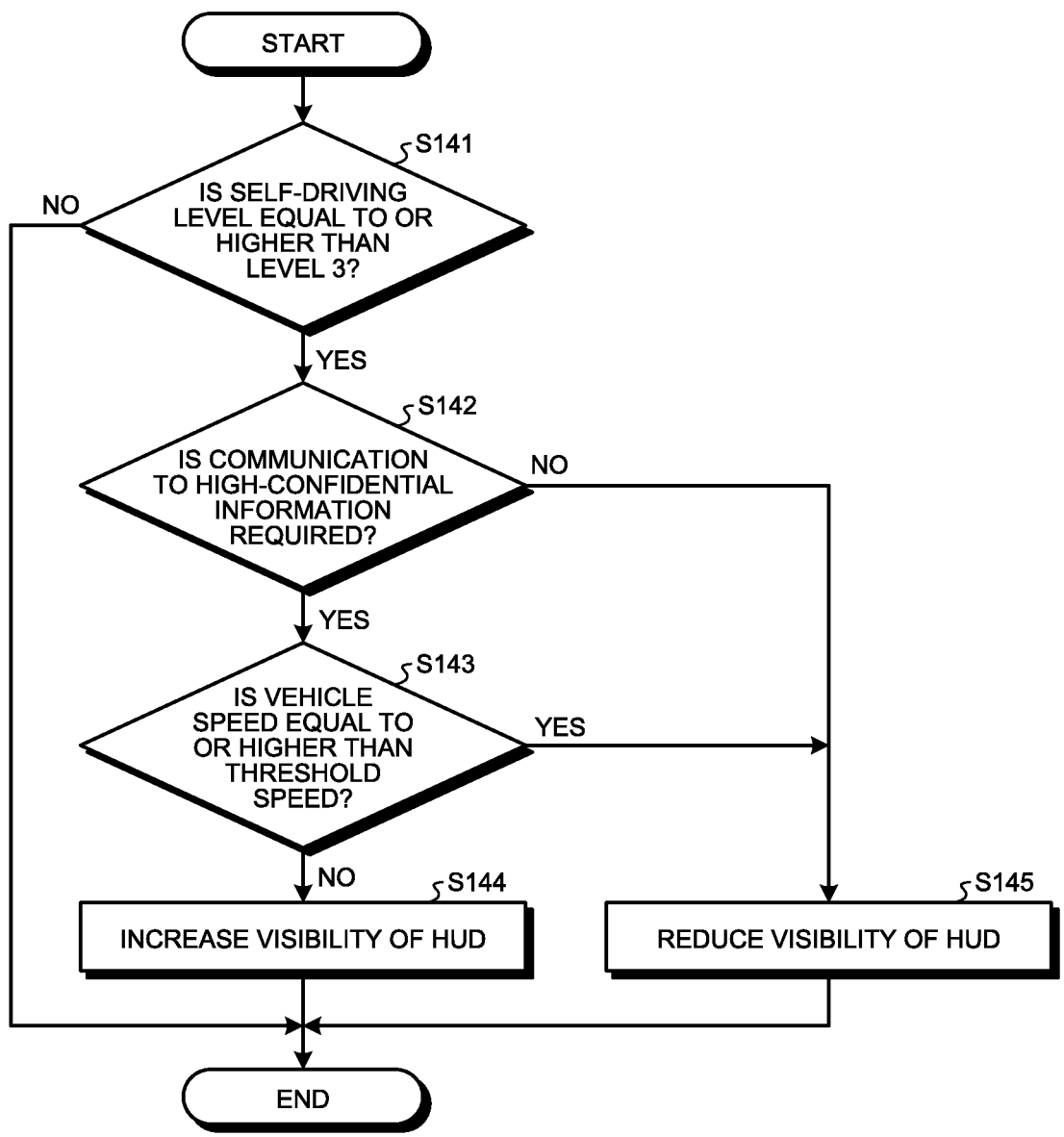
FIG. 9 is a flowchart illustrating a flow of processes performed by an on-vehicle communication device according to a fourth embodiment.

An on-vehicle communication device 20 according to a fourth embodiment will be described with reference to FIG. 9. FIG. 9 is a flowchart illustrating a flow of processes performed by the on-vehicle communication device according to the fourth embodiment. The fourth embodiment is different from the first embodiment in that the controller 27 and the video processor 28 of the on-vehicle communication device 20 perform different processes.

The control unit 27 validates the access from the mobile electronic device 100 to the communication unit 24 of the on-vehicle communication device 20 and the access to the storage 25. The controller 27 determines whether to increase visibility of a video to be displayed, based on the self-driving level information acquired by the self-driving level acquiring unit 23 and the vehicle speed information acquired by the vehicle speed information acquiring unit 211. In the fourth embodiment, the increasing of the visibility of the video to be displayed is performed by increasing display resolution or luminance of a video projected by the HUD 16 to thereby increase the visibility of the virtual image. Reducing of the visibility of the video to be displayed is performed by reducing the display resolution or the luminance of the video projected by the HUD 16 to an extent such that the virtual image is not viewed from the outside of the vehicle to thereby reduce the visibility of the virtual image. When the visibility is reduced, the possibility that the virtual image is looked at or captured by surrounding vehicles or persons is reduced.

More specifically, the controller 27 increases the visibility of the HUD 16 by increasing the visibility of the virtual image when the self-driving level is equal to or higher than a predetermined level and the vehicle speed is equal to or higher than a threshold speed, based on the self-driving level information and the vehicle speed information. The controller 27 reduces the visibility of the HUD 16 by reducing the visibility of the virtual image when the self-driving level is lower than the predetermined level or the vehicle speed is lower than the threshold speed, based on the self-driving level information and the vehicle speed information.

Alternatively, the controller 27 determines whether to increase the visibility of the virtual image based on the self-driving level information acquired by the self-driving level acquiring unit 23 and the current location information on the vehicle acquired by the positional information acquiring unit 212. More specifically, the controller 27 increases the visibility of the virtual image when the self-driving level is equal to or higher than the predetermined level and the current location of the vehicle indicates a predetermined place, based on the self-driving level information and the positional information. The controller 27 reduces the visibility of the virtual image when the self-driving level is lower than the predetermined level or the current location of the vehicle does not indicate the predetermined place, based on the self-driving level information and the positional information.

When causing the projector of the HUD 16 to display a video, the video processor 28 changes the visibility of the virtual image by changing the display resolution or the luminance of the video to thereby change the visibility of the HUD 16, based on the level of the visibility determined by the controller 27. More specifically, the video processor 28 increases the visibility of the virtual image by increasing the display resolution or the luminance of the video to thereby increase the visibility of the HUD 16. The video processor 28 reduces the visibility of the virtual image by reducing the display resolution or the luminance of the video to thereby reduce the visibility of the HUD 16.

Next, the flow of processes performed by the controller 27 will be described with reference to FIG. 9. Processes at Step S141 to Step S143 are the same as the processes at Step S101 to Step S103 in the flowchart illustrated in FIG. 4.

When the self-driving level is equal to or higher than the level 3 and the communication to the high-confidential information is not required (No at Step S142), the controller 27 increases the visibility of the HUD 16 (Step S145).

Further, when the self-driving level is equal to or higher than the level 3, the to the high-confidential information is required, and the vehicle speed is not equal to or higher than the threshold speed (No at Step S143), the controller 27 reduces the visibility of the HUD 16 (Step S144). The controller 27 terminates the processes.

When the self-driving level is equal to or higher than the level 3, the communication to the high-confidential information is required, and the vehicle speed is equal to or higher than the threshold speed (Yes at Step S143), the controller 27 increases the visibility of the HUD 16 (Step S145). The controller 27 terminates the processes.

As described above, in the fourth embodiment, when the mobile electronic device 100 performs communication to the high-confidential information, it is possible to increase or reduce the visibility of the HUD 16 in accordance with the self-driving level and the vehicle speed or the current location of the vehicle. According to the fourth embodiment, when the self-driving level is equal to or higher than the level 3, it is possible to increase the visibility of the HUD 16 based on the vehicle speed or the current location of the vehicle. Therefore, in the fourth embodiment, when the self-driving level is equal to or higher than the level 3, it is possible to view a video including the high-confidential information with increasing the visibility of the HUD 16 at a vehicle speed or in a certain place at/in which the video is less likely to be looked at or captured by surrounding vehicles or persons. Further, in the fourth embodiment, when the self-driving level is equal to or higher than the level 3, it is possible to view a video including the high-confidential information with reducing the visibility of the HUD 16 at a vehicle speed or in a certain place at/in which the video is highly likely to be looked at or captured by surrounding vehicles or persons.

Although the video processor 28 of this embodiment changes at least one of the resolution and the luminance of the display based on the level of the visibility, but the embodiment is not limited to this. For example, the video processor 28 may cause some important keyword or display object in the video to be viewed when the visibility is high, and may not allow the important keyword or display object in the video to be viewed when the visibility is low. Herein, the video processor 28 can determine important keywords or display objects, since the key keywords or display objects are displayed synchronously with the video. Thus, it is possible to reliably reduce the risk of leakage of important keywords and display objects in the video.

Fifth Embodiment

Figure 10:
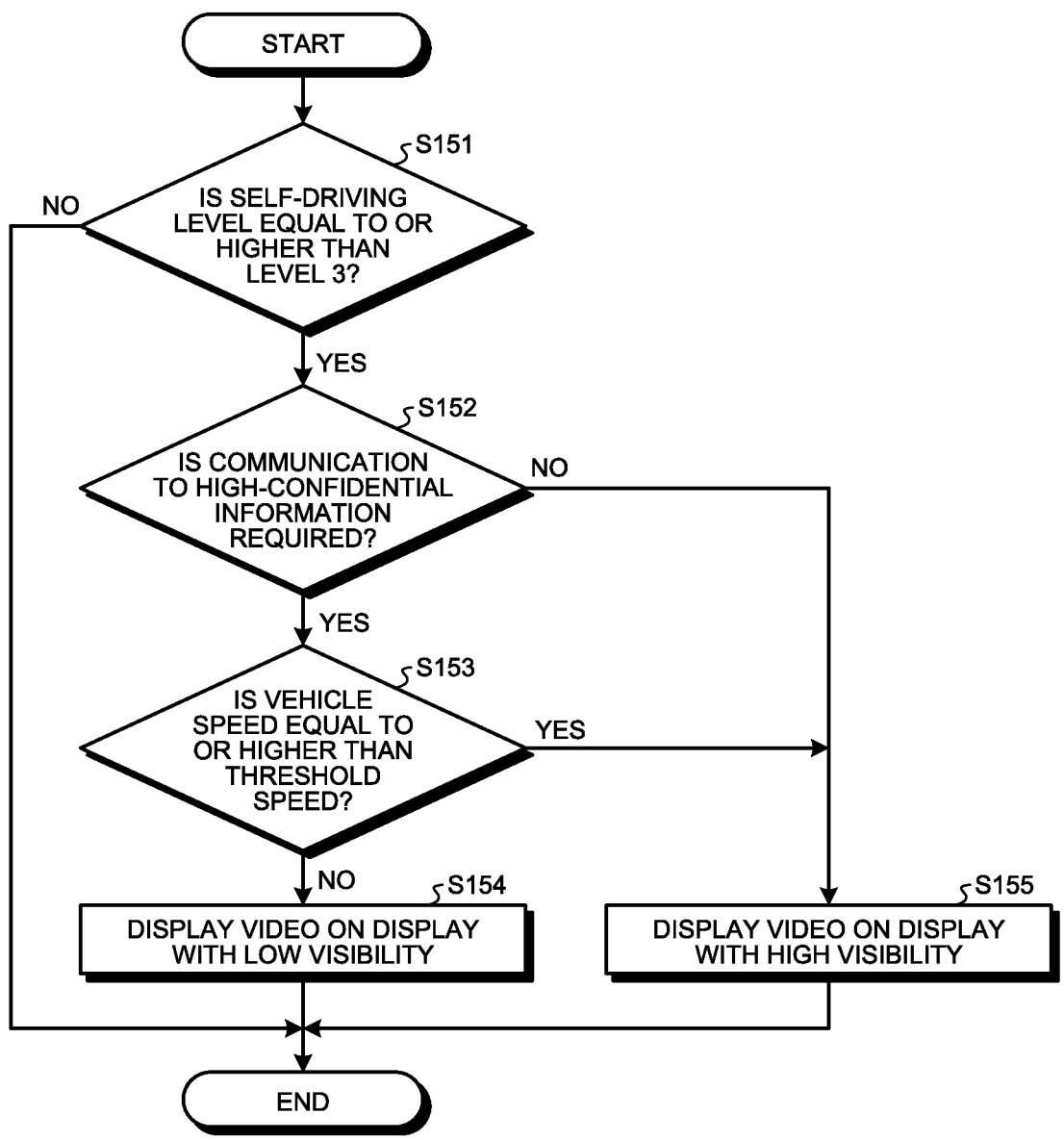
FIG. 10 is a flowchart illustrating a flow of processes performed by an on-vehicle communication device according to a fifth embodiment.

An on-vehicle communication device 20 according to a fifth embodiment will be described with reference to FIG. 10. FIG. 10 is a flowchart illustrating a flow of processes performed by the on-vehicle communication device according to the fifth embodiment. The fifth embodiment is different from the first embodiment in that the controller 27 and the video processor 28 of the on-vehicle communication device 20 perform different processes.

The controller 27 determines whether to increase visibility of a video to be displayed, based on the self-driving level information acquired by the self-driving level acquiring unit 23 and the vehicle speed information acquired by the vehicle speed information acquiring unit 211. In the fifth embodiment, the increasing of the visibility of the video to be displayed is performed by displaying the video on a display with high visibility. Reducing of the visibility of the video to be displayed is performed by displaying the video on a display with low visibility with which the video is not visible from the outside of the vehicle.

The display with high visibility is a display that has high visibility and is highly likely to be looked at or captured by surrounding vehicles or persons. The display with high visibility is, for example, the HUD 16.

The display with low visibility is a display that has low visibility and is less likely to be looked at or captured by surrounding vehicles or persons. The display with low visibility is, for example, a display that is arranged in front of a seat of the vehicle and is generally arranged below a windshield or a combiner. Alternatively, the display with low visibility may be, for example, a display of the mobile electronic device 100.

The controller 27 determines a display for displaying a video, based on the self-driving level information acquired by the self-driving level acquiring unit 23 and the vehicle speed information acquired by the vehicle speed information acquiring unit 211. More specifically, the controller 27 displays a video on the display with high visibility when the self-driving level is equal to or higher than a predetermined level and the vehicle speed is equal to or higher than the threshold speed, based on the self-driving level information and the vehicle speed information. The controller 27 displays a video on the display with low visibility when the self-driving level is lower than the predetermined level or the vehicle speed is lower than the threshold speed, based on the self-driving level information and the vehicle speed information.

Alternatively, the controller 27 determines a display for displaying a video, based on the self-driving level information acquired by the self-driving level acquiring unit 23 and the current location information on the vehicle acquired by the positional information acquiring unit 212. More specifically, the controller 27 displays a video on the display with high visibility when the self-driving level is equal to or higher than a predetermined level and the current location of the vehicle indicates the predetermined place, based on the self-driving level information and the positional information. The controller 27 displays a video on the display with low visibility when the self-driving level is lower than the predetermined level or the current location of the vehicle does not indicate the predetermined place, based on the self-driving level information and the positional information.

The video processor 28 causes the display determined by the controller 27 to display the video.

Next, the flow of processes performed by the controller 27 will be described with reference to FIG. 10. Processes at Step S151 to Step S153 are the same as the processes at Step S101 to Step S103 in the flowchart illustrated in FIG. 4.

When the self-driving level is equal to or higher than the level 3 and the communication to the high-confidential information is not required (No at Step S152), the video is displayed on the display with high visibility (Step S155).

Further, when the self-driving level is equal to or higher than the level 3, the communication to the high-confidential information is required, and the vehicle speed is not equal to or higher than the threshold speed (No at Step S153), the controller 27 displays the video on the display with low visibility (Step S154). The controller 27 terminates the processes.

When the self-driving level is equal to or higher than the level 3, the communication to the high-confidential information is required, and the vehicle speed is equal to or higher than the threshold speed (Yes at Step S153), the video is displayed on the display with high visibility (Step S155). The controller 27 terminates the processes.

As described above, in the fifth embodiment, when the mobile electronic device 100 performs the communication to the high-confidential information, it is possible to display a video on the display with high visibility or the display with low visibility in accordance with the self-driving level and the vehicle speed or the current location of the vehicle. In the fifth embodiment, when the self-driving level is equal to or higher than the level 3, a video is displayed on the display with high visibility based on the vehicle speed or the current location of the vehicle. Therefore, in the fifth embodiment, when the self-driving level is equal to or higher than the level 3, it is possible to display a video including the high-confidential information on the display with high visibility at a vehicle speed or in a certain place at/in which the video is less likely to be looked at or captured by surrounding vehicles or persons. Further, in the fifth embodiment, when the self-driving level is equal to or higher than the level 3, it is possible to display a video including the high-confidential information on the display with low visibility at a vehicle speed or in a certain place at/in which the video is highly likely to be looked at or captured by surrounding vehicles or persons.

Sixth Embodiment

Figure 11:
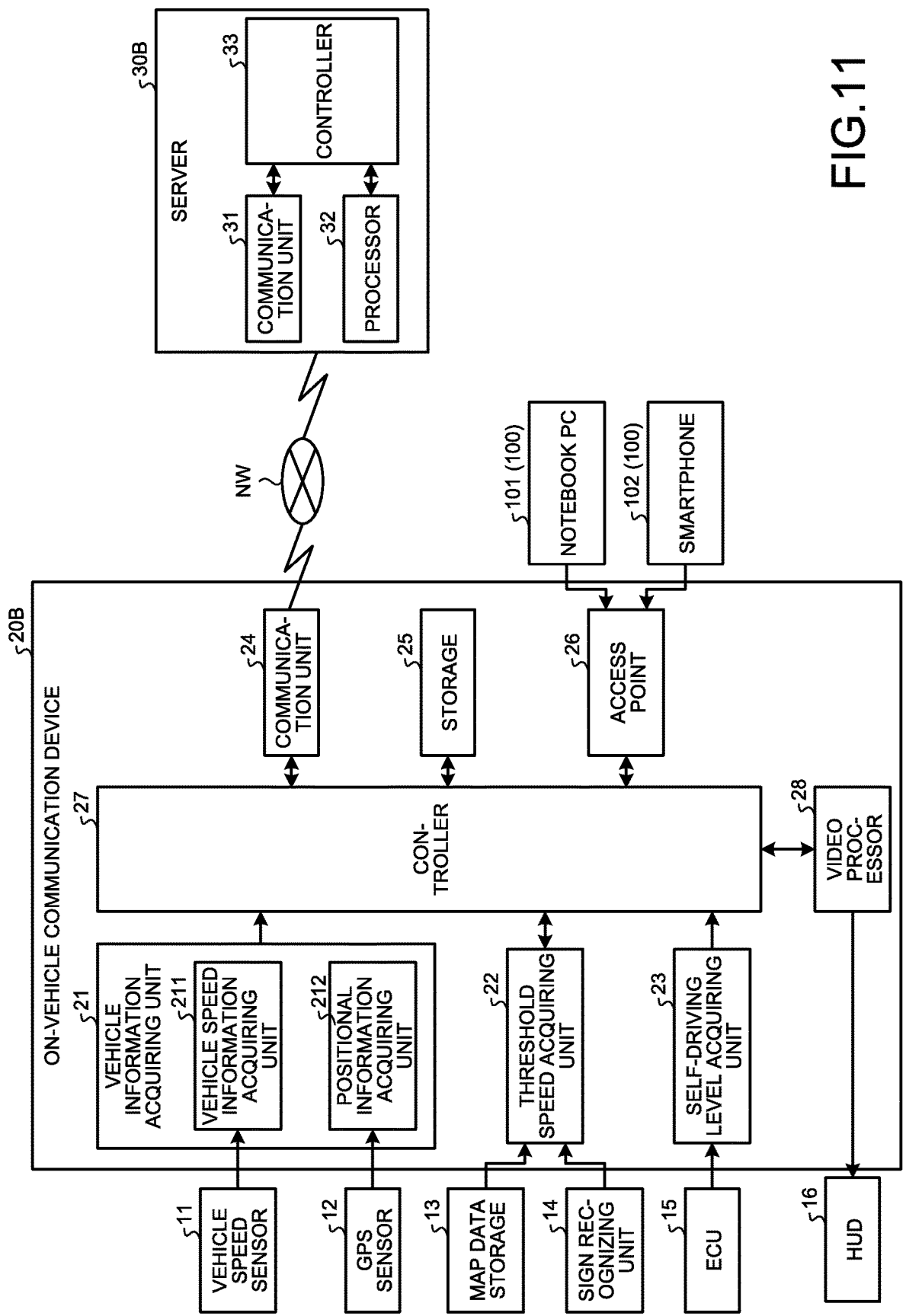
FIG. 11 is a block diagram illustrating a configuration example of an on-vehicle communication device according to a sixth embodiment.
Figure 12:
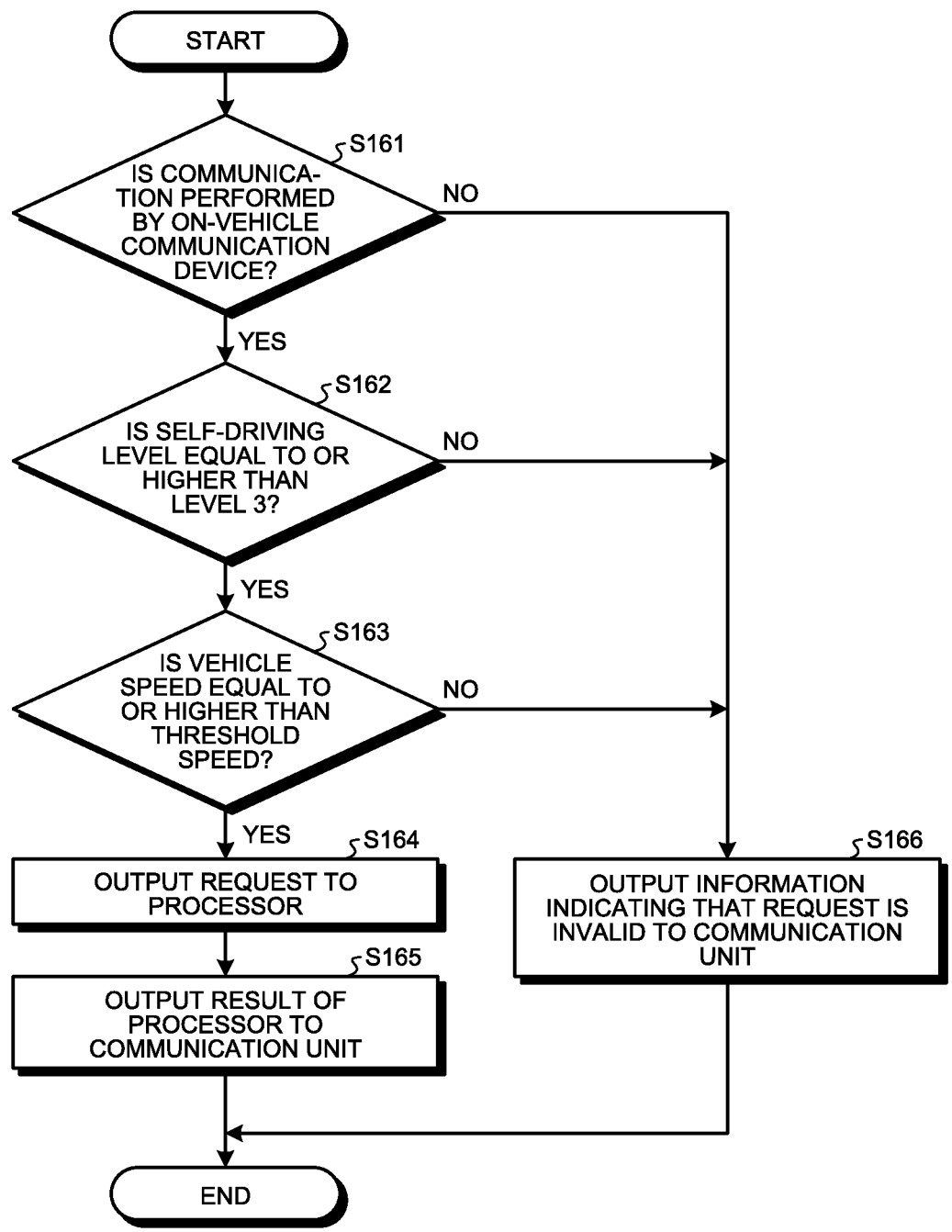
FIG. 12 is a flowchart illustrating a flow of processes performed by the on-vehicle communication device according to the sixth embodiment.

An on-vehicle communication device 20B according to a sixth embodiment will be described with reference to FIG. 11 and FIG. 12. FIG. 11 is a block diagram illustrating a configuration example of the on-vehicle communication device according to the sixth embodiment. FIG. 12 is a flowchart illustrating a flow of processes performed by the on-vehicle communication device according to the sixth embodiment. The sixth embodiment is different from the first embodiment or the third embodiment in that the controller 27 and the video processor 28 of the on-vehicle communication device 20B perform different processes.

The on-vehicle communication device 20B is able to execute a web application via a web browser. The on-vehicle communication device 20B is connected to a server device 30B so as to be able to transmit and receive data to and from the server device 30B via the communication network NW, where the server device 30B stores therein confidential information. While it is assumed that the on-vehicle communication device 20B is able to execute a web application in this example, it may be possible to operate a native application that enables access to the server device 30B.

The controller 27 transmits a request to the server device 30B via the communication unit 24. The request includes source information, request information, vehicle speed information, threshold information that is information on a threshold speed or the like, and a self-driving level. The request information includes, for example, the high-confidential communication of the first embodiment or the communication corresponding to the confidentiality level of the second embodiment.

The source information is information for identifying the communication unit 24 and includes, for example, an IP address and a port number.

The server device 30B is a web server device. The server device 30B includes a communication unit 31, a processor 32, and a controller 33.

The communication unit 31 acquires the source information, the request, the vehicle speed information, the threshold information, and the self-driving level from the communication unit 24 of the on-vehicle communication device 20B. The communication unit 31 outputs the source information, the request, the vehicle speed information, the threshold information, and the self-driving level acquired to the controller 33. The communication unit 31 transmits a result of the request acquired from the controller 33 to the communication unit 24.

The processor 32 processes the request upon acquiring the request information from the controller 33. A process on the request is, for example, a process of transmitting predetermined information from the server device 30B to the on-vehicle communication device 20B.

The controller 33 determines whether to perform a process on the request information, based on the self-driving level information and the vehicle speed information or the current location information. In the sixth embodiment, the controller 33 performs the process on the request information when the source information indicates the on-vehicle communication device 20B, the self-driving level is equal to or higher than the level 3, and the vehicle speed is equal to or higher than the threshold speed, based on the self-driving level information and the vehicle speed information. The controller 33 determines that the request is invalid and does not perform the process on the request information when the source information does not indicate the on-vehicle communication device 20B, the self-driving level is not equal to or higher than the level 3, or the vehicle speed is not equal to or higher than the threshold speed, based on the self-driving level information and the vehicle speed information. The controller 33 stores therein, in advance, the source information indicating the on-vehicle communication device 20B.

Next, the flow of processes performed by the controller 33 will be described with reference to FIG. 12.

The controller 33 determines whether communication is performed by the on-vehicle communication device 20B (Step S161). More specifically, when the controller 33 determines that the communication is performed by the on-vehicle communication device 20B based on the source information received by the communication unit 31 (Yes at Step S161), the process proceeds to Step S162. When the controller 33 does not determine that the communication is performed by the on-vehicle communication device 20B based on the source information received by the communication unit 31 (No at Step S161), the process proceeds to Step S166.

The controller 33 determines whether the self-driving level of the on-vehicle communication device 20B is equal to or higher than the level 3 based on the self-driving level information acquired by the communication unit 31 (Step S162). When the controller 33 determines that the self-driving level is equal to or higher than the level 3 (Yes at Step S162), the process proceeds to Step S163. When the controller 33 determines that the self-driving level is not equal to or higher than the level 3 (No at Step S162), the process proceeds to Step S166.

When it is determined that the self-driving level is equal to or higher than the level 3 (Yes at Step S162), the controller 33 determines whether the vehicle speed is equal to or higher than the threshold speed (Step S163). More specifically, when the controller 33 determines that the vehicle speed is equal to or higher than the threshold speed based on the vehicle speed information and the threshold speed information acquired by the communication unit 31 (Yes at Step S163), the process proceeds to Step S164. When the controller 33 determines that the vehicle speed is not equal to or higher than the threshold speed (No at Step S163), the process proceeds to Step S166.

When the communication is performed by the on-vehicle communication device 20B, the self-driving level is equal to or higher than the level 3, and the vehicle speed is equal to or higher than the threshold speed (Yes at Step S163), the controller 33 outputs the request to the processor 32 (Step S164). The controller 33 proceeds to Step S165.

The controller 33 outputs a result of the process performed by the processor 32 to the communication unit 31 (Step S165). The controller 33 terminates the processes.

When it is determined that the communication is not performed by the on-vehicle communication device 20B

(Yes at Step S161), the communication is performed by the on-vehicle communication device 20B and the self-driving level is not equal to or higher than the level 3 (No at Step S162), or the communication is performed by the on-vehicle communication device 20B and the self-driving level is equal to or higher than the level 3 and the vehicle speed is not equal to or higher than the threshold speed (No at Step S163), the controller 33 outputs information indicating that the request is invalid to the communication unit 31 (Step S166). The controller 33 terminates the processes.

As described above, in the sixth embodiment, even when the on-vehicle communication device 20B executes a web application and the server device 30B is a web server device, it is possible to appropriately control communication with the outside of the vehicle in accordance with the self-driving level of the vehicle.

While the on-vehicle communication device 20 according to the present application has been described above, the present application may be embodied in various forms other than the embodiments as described above.

The components of the on-vehicle communication device 20 illustrated in the drawings are functionally conceptual and need not necessarily be physically configured in the manner illustrated in the drawings. In other words, specific forms of the devices are not limited to those illustrated in the drawings, and all or part of the devices may be functionally or physically distributed or integrated in arbitrary units depending on various loads or use conditions of the devices.

The configuration of the on-vehicle communication device 20 is implemented as software by, for example, a program loaded on a memory. It is explained that the functional blocks are implemented by cooperation with hardware or software. In other words, the functional blocks are realized in various forms using only hardware, using only software, or using a combination of hardware and software.

The components described above include one that can easily be thought of by a person skilled in the art and one that is practically identical. Further, the configurations described above may be combined appropriately. Furthermore, within the scope not departing from the gist of the present application, various omission, replacement, and modifications of the components may be made.

In the embodiments described above, the controller 27 determines whether the access to the communication unit 24 and the storage 25 is permitted based on the self-driving level, the confidentiality of information, and the vehicle speed. Alternatively, the controller 27 determines whether the access to the communication unit 24 and the storage 25 is permitted based on the self-driving level, the confidentiality of information, and the current location information. However, the controller 27 may determine whether the access to the communication unit 24 and the storage 25 is permitted based on an identifier for identifying the mobile electronic device 100, in addition to the self-driving level, the confidentiality of information, the vehicle speed, and the current location information.

Specifically, the additional information included in a packet transmitted from the mobile electronic device 100 to the access point 26 includes the identifier for identifying the mobile electronic device 100. Further, the storage 25 stores therein, in advance, a list of identifiers of the mobile electronic device 100 for which the access to the communication unit 24 and the storage 25 are disabled.

As one example, in the first embodiment, a step of determining whether the identifier of the mobile electronic device 100 matches any of the identifiers in the list stored in the storage 25 may be added prior to Step S101 illustrated in FIG. 4. When the controller 27 determines that the identifier of the mobile electronic device 100 matches any of the identifiers in the list stored in the storage 25, the process proceeds to Step S101. When the controller 27 determines that the identifier of the mobile electronic device 100 does not match any of the identifiers in the list stored in the storage 25, the process proceeds to Step S106. Further, in the other embodiments, the same step may be added prior to the step of determining the self-driving level as in Step S101 illustrated in FIG. 4.

With this configuration, for example, it is possible to always permit access to the high-confidential information with respect to a mobile electronic device of an occupant who sits in a seat in which the information is less likely to be looked at, such as an occupant who is in a backseat around which a window film or the like is provided.

In the embodiments as described above, the controller 27 determines whether the self-driving level is equal to or higher than the level 3, but the embodiments are not thus limited. For example, it may be possible to determine whether the level corresponds to a level at which the system monitors the travel state of the vehicle or a level at which it is possible to leave the driving of the vehicle over to the vehicle.

The process performed by the controller 33 of the sixth embodiment is not limited to the process as described above, but may be process that implements the same functions as the processes of the second embodiment to the fifth embodiment.

While it is explained that the processor 32 of the sixth embodiment is included in the server device 30B, the processor 32 may be configured as a server device, such as an application programming interface (API) server, separated from the server device 30B.

According to the present application, it is possible to appropriately control communication with the outside of a vehicle in accordance with a self-driving level of the vehicle.

Although the application has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. An on-vehicle communication device comprising:
   a memory that is configured to store computer executable instructions; and
   a processor that is configured to execute the computer executable instructions to perform operations, comprising:
      acquiring vehicle speed information on a vehicle capable of performing self-driving;
      acquiring self-driving level information indicating whether the vehicle is controlled for the self-driving by at least one system of the vehicle;
      disabling, when the self-driving level information is equal to or higher than a level 3 and the vehicle speed information is lower than a first threshold speed, a connection to a communication channel listed in an access control list stored in a storage;
      determining, when the self-driving level information is equal to or higher than the level 3 and the vehicle speed information is equal to or higher than the first threshold speed and lower than a second threshold speed, a first level as an accessible confidentiality level for a high-confidential information on which a confidentiality level including multiple levels is set, enabling the connection to the communication channel listed in the access control list, and limiting accessible information according to the determined accessible confidentiality level, and determining when the self-driving level information is equal to or higher than the level 3 and the vehicle speed information is equal to or higher than the second threshold speed, a second level as the accessible confidentiality level, enabling the connection to the communication channel listed in the access control list, and limiting accessible information according to the determined accessible confidentiality level, wherein the second level includes the first level determined as the accessible confidentiality level, and the level 3 is self-driving with conditions.

2. A communication control method comprising:

acquiring vehicle speed information on a vehicle capable of performing self-driving;

acquiring self-driving level information indicating whether the vehicle is controlled for the self-driving by at least one system of the vehicle;

disabling, when the self-driving level information is equal to or higher than a level 3 and the vehicle speed information is lower than a first threshold speed, a connection to a communication channel listed in an access control list stored in a storage;

determining when the self-driving level information is equal to or higher than the level 3 and the vehicle speed information is equal to or higher than the first threshold speed and lower than a second threshold speed, a first level as an accessible confidentiality level for a high-confidential information on which a confidentiality level including multiple levels is set, enabling the connection to the communication channel listed in the access control list, and limiting accessible information according to the determined accessible confidentiality level; and determining when the self-driving level information is equal to or higher than the level 3 and the vehicle speed information is equal to or higher than the second threshold speed, a second level as the accessible confidentiality level, enabling the connection to the communication channel listed in the access control list, and limiting accessible information according to the determined accessible confidentiality level, wherein the second level includes the first level determined as the accessible confidentiality level, and the level 3 is self-driving with conditions.

3. A non-transitory storage medium that stores a computer program for causing a computer to execute:

acquiring vehicle speed information on a vehicle capable of performing self-driving and current location information on the vehicle;

acquiring self-driving level information indicating whether the vehicle is controlled for the self-driving by at least one system of the vehicle;

disabling, when the self-driving level information is equal to or higher than a level 3 and the vehicle speed information is lower than a first threshold speed, a connection to a communication channel listed in an access control list stored in a storage;

determining, when the self-driving level information is equal to or higher than the level 3 and the vehicle speed information is equal to or higher than the first threshold speed and lower than a second threshold speed, a first level as an accessible confidentiality level for a high-confidential information on which a confidentiality level including multiple levels is set, enabling the connection to the communication channel listed in the access control list, and limiting accessible information according to the determined accessible confidentiality level; and determining when the self-driving level information is equal to or higher than the level 3 and the vehicle speed information is equal to or higher than the second threshold speed, a second level as the accessible confidentiality level, enabling the connection to the communication channel listed in the access control list, and limiting accessible information according to the determined accessible confidentiality level, wherein the second level includes the first level determined as the accessible confidentiality level, and the level 3 is self-driving with conditions.

* * * * *